July 23, 1957 V. W. BOLIE 2,800,596
DISTRIBUTING DELAY LINE USING NON-LINEAR PARAMETERS
Filed May 24, 1956
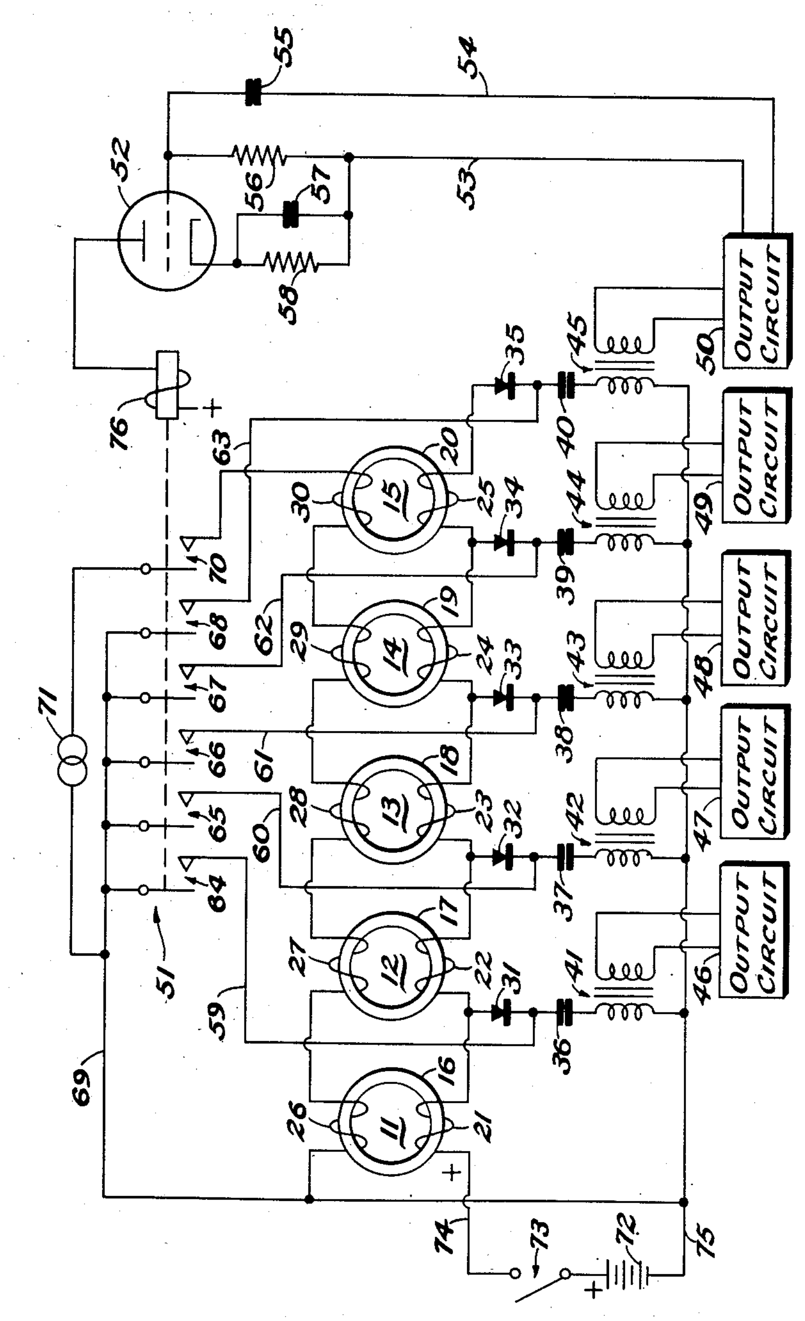
INVENTOR.
VICTOR W. BOLIE
BY
[signature]
ATTORNEY United States Patent Office 2,800,596

Patented July 23, 1957

2,800,596

DISTRIBUTING DELAY LINE USING NON-LINEAR PARAMETERS

Victor W. Bolie, Cedar Rapids, Iowa, assignor to Collins Radio Company, Cedar Rapids, Iowa, a corporation of Iowa Application May 24, 1956, Serial No. 586,976

3 Claims. (Cl. 307—88)

This invention relates to distributor circuits for distributing electrical pulses in a predetermined sequence to a plurality of electrical circuits. More particularly, this invention pertains to delay lines using saturable magnetic inductors and capacitors in timing circuits for determining intervals between generated electrical pulses and for distributing them in sequence to a plurality of circuits.

The distributing delay line of this invention may be used to replace mechanical switching circuits or electronic multivibrator circuits commonly encountered in computing circuits and in communication circuits for distributing electrical pulses. For example, in teletypewriter circuits, mechanical switching arrangements distribute bits of information to solenoid operated mechanisms. This mechanical switching circuit, which is exposed to considerable wear, may be replaced by distributor circuits of this invention when used in conjunction with conventional gating circuits.

An object of the present invention is to provide distributing delay lines that are responsive to input pulses for successively supplying impulses at predetermined intervals to a plurality of circuits.

Another object is to provide reliable circuits for repeatedly supplying accurately spaced electrical pulses in particular sequence to a plurality of electrical circuits.

The objects, description, and appended claims may be more readily understood with reference to the single drawing which shows schematically a distributing delay line having five stages.

Each of the five cascade stages has a saturable inductive reactor for controlling the charging rate of a respective capacitor. When the core of a reactor becomes saturated, a respective capacitor is charged instantly through the primary winding of a respective output transformer. The instantaneous increase in current through the primary winding produces an electrical pulse which is induced into the secondary for application to an output circuit.

In detail, the distributing delay line includes a plurality of toroidal inductors 11 through 15 that consist of annular ferromagnetic cores 16 through 20 upon which are wound individual control windings 21 through 25 and reset windings 26 through 30, respectively. Cores 16 through 20 are fabricated from one of the ferromagnetic materials that have rectangular hysteresis characteristics. Characteristics and compositions of suitable ferromagnetic materials, $Fe_2O_3$—MgO—MnO square-loop compositions, are presented in "A Study on Magnetic Ceramics," Technical Report 78, distributed by the United States Department of Commerce, Office of Technical Services. When the flux density in one of these cores is low, the permeability is high, so that the inductive reactance of the respective control winding is also high. When the flux density is increased until the core is near saturation, an abrupt reduction in permeability is caused by a small additional increase in coercive force, such as may be supplied by the control winding. Because of the fairly high retentivity of the magnetic material, the core then remains in a saturated condition and the permeability remains low until a demagnetizing force is applied.

The main delay line circuit is a ladder-type circuit which consists of control windings 21 through 25 of inductors 11 through 15, respectively, connected in series and a shunt arm connected at each of the junctions of the control windings and at the end of the line. Each of the shunts arms has a respective one of the rectifiers 31 through 35, of the capacitors 36 through 40, and the respective one of the primary windings of the pulse output transformers 41 through 45 connected in series. Each of the secondary windings of transformers 41 through 45 is connected to a respective output circuit which is to receive an electrical pulse at a predetermined time.

A resetting circuit is required for discharging the capacitors and for demagnetizing the cores of the inductors. An example of a resetting circuit is shown in the accompanying figure in which the triode electron tube 52 cooperates with switching relay 51 to short circuit capacitors 36 through 40 momentarily and to apply a demagnetizing current to serially connected reset windings 26 through 30. The control grid of control tube 52 is connected through coupling capacitor 55 and conductor 54 to output circuit 50. The control grid circuit also includes the usual grid resistor 56. The cathode of tube 52 is connected through the usual cathode resistor 58, by-pass capacitor 57, and return conductor 53 to output circuit 50. The plate of the tube is connected through winding 76 of relay 51 to a source of positive plate voltage. When the winding is energized, the relay closes contacts 64 through 68 and contacts 70. Contacts 64 through 68 are connected through conductors 59 through 63 for short-circuiting capacitors 36 through 40, respectively.

In the circuit shown in the figure, the armatures of these contacts are connected to a common conductor 69 which completes the circuit for discharging capacitors 36 through 40 through the respective primary windings of the output transformers 41 through 45. If the pulse of reverse polarity, that is formed when capacitors 36 through 40 are discharged through the primary windings, is deleterious in output circuits 46 through 50, conductor 69 may be disconnected from the relay armatures and the armatures may be connected through individual conductors to the respective capacitors so that operation of the relay places a short circuit directly across the individual capacitors. The normally open contact 70 of relay 51 is connected in series with resetting windings 26 through 30 of inductors 11 through 15 and with a source of A.-C. voltage 71.

The control circuit for the resetting operation may be modified as required for particular applications. Electronic or magnetic gating circuits may be employed in place of relay circuits for fast operation or for reliability when the operation is repeated a very large number of times. Separate windings for resetting are not necessarily required. Switching arrangements may be provided for sending a reverse pulse through the control windings to reset the inductor cores.

The distributing delay line operates in response to the application of direct-current voltage between conductors 74 and 75 at the input of the line. In the present illustration the source of D.-C. voltage is shown as source 72 in series with switch 73. When switch 73 is closed, current flows through control winding 21 and rectifier 31 for charging capacitor 36. At first, voltage builds up slowly on capacitor 36 because the permeability of associated core 16, being initially high, provides high impedance at the control winding. After an interval, the current flow induces sufficient magnetic flux into core 16 to cause its saturation. When the core becomes saturated, the impedance of control winding 21 drops suddenly so that an impulse of current is produced for quickly charging capacitor 36. The charging current flows through serially connected primary winding of transformer 41 for applying a pulse to output circuit 46 which is connected to the secondary winding of the transformer. The impedance of control winding 21 remains low until core 16 is reset by demagnetization. As capacitor 36 charges, the impedance of the first arm in the delay circuit becomes infinite and nearly full voltage from source 72 is applied through control winding 21 to control winding 22 of the succeeding inductor.

In a like manner, current for charging capacitor 37, which is in the second arm of the delay line, is delayed by high impedance of control winding 22. When core 17 becomes saturated, an impulse of current is applied through output transformer 42 to a second output circuit 47. The succeeding circuits operate similarly so that impulses are applied in sequence to output circuits 48, 49, and 50. Although rectifiers 31 through 35 are not necessary for operation of the circuit, their use damps oscillation that may prevent formation of sharp pulses for application to the output circuits.

In response to the application of an impulse to the final output circuit 50, an impulse is applied for momentarily increasing the current flow through control tube 52 and thereby to operate momentarily control relay 51 that is connected in the plate circuit. Operation of the relay closes contacts 64 through 68 for discharging capacitors 36 through 40, respectively, and closes contact 70 for applying A.-C. voltage to the serially connected reset windings 26 through 29. The delay line has now been reset so that D.-C. voltage may be again applied across conductors 74 and 75 for developing another series of distributed pulses. If desired, the circuit may be modified so that it will operate repeatedly without application of starting pulses from an external source. For example, control switch 73 may be a pair of normally closed contacts operated by relay 51. In this modification, control voltage is applied automatically to the input of the delay line when reset relay 51 releases. When the interval between the impulses is to be substantially greater than the operating time of relay 51, a time-delay network may be connected to conductors 53 and 54 which are in the input circuit of the control tube. A desired interval can then be obtained between the applications of a pulse to the final output circuit 50 and to the first output circuit 46.

The circuit described above may be applied in many systems where impulses separated by predetermined intervals are to be applied in a particular sequence to different circuits. For example, the circuit may be applied to the "Code Converter" described in copending application 568,219, filed February 28, 1956, by George F. Grondin. In this system the distributor-ring circuit, which consists of a plurality of flip-flops or multivibrator circuits for operating gate circuits, may be replaced with a distributing delay line described in this application. Also, the source of clock pulses for this system may be replaced by the distributor delay line when it is connected to operate repeatedly.

Although this invention has been described with respect to a particular embodiment thereof, it is not to be so limited as changes and modifications may be made therein which are within the full intended scope of the invention as defined by the appended claims.

What I claim is:

1. A distributing delay line having a plurality of sections arranged in cascade in a ladder-type network, each section having an inductor, a capacitor, and an output circuit serially connected, said inductor having a ferromagnetic core with rectangular hysteresis characteristics, means for applying direct-current voltage across the first one of said sections at the input of said line, and each of said sections being responsive after the application of substantial voltage thereacross for applying an electrical pulse to the corresponding one of said output circuits and for applying substantial voltage to a succeeding one of said sections.

2. A distributing delay line having a plurality of inductors, each inductor having a control winding and a reset winding on a ferromagnetic core which has rectangular hysteresis characteristics and substantial retentivity, a plurality of shunt arms, each of the said arms having a serially connected capacitor and an output circuit, said control windings and said shunt arms being connected in a ladder-type delay line network, means for applying direct-current voltage to said delay line, said delay line operating in response to the application of said direct-current voltage to magnetize said core and to charge said capacitors, thereby to apply delayed pulses successively to said output circuits, and means responsive to the operation of said delay line for discharging said capacitors and for demagnetizing said cores.

3. A distributing delay line having a plurality of sections in cascade in a ladder-type network, each section comprising an inductor, a diode rectifier, a capacitor, and an output circuit serially connected, said inductor having a ferromagnetic core with rectangular hysteresis characteristics and high retentivity, means for applying direct-current voltage to said delay line, said delay line operating in response to the application of direct-current voltage for applying successively at predetermined intervals a pulse to each of said output circuits, means responsive to the operation of said delay line for discharging said capacitors, and means also responsive to the operation of said delay line for demagnetizing said cores.

No references cited.